even a light United States Patent Office 3,540,995
Patented Nov. 17, 1970

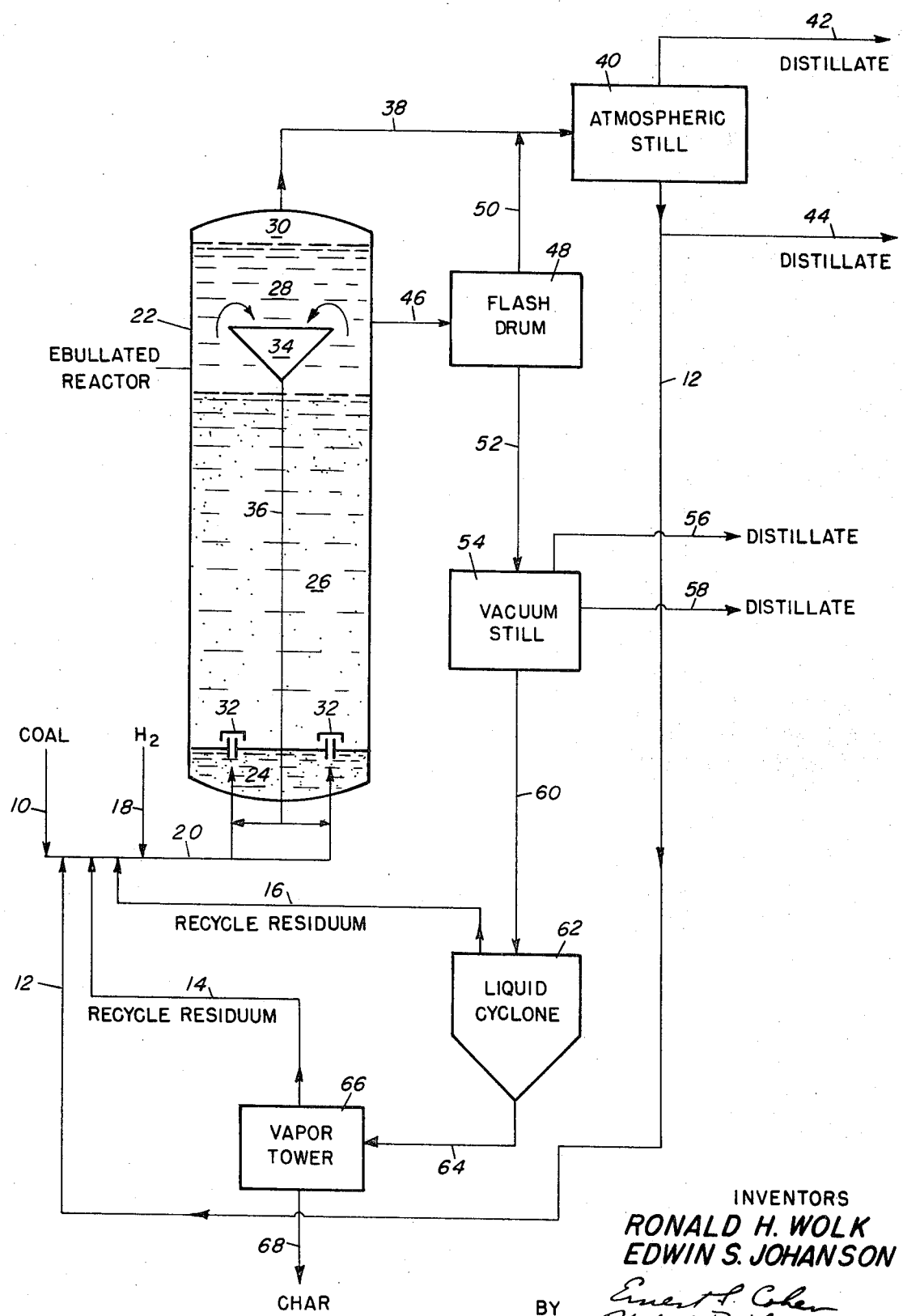

3,540,995
H-COAL PROCESS: SLURRY OIL SYSTEM
Ronald H. Wolk, Lawrence Township, and Edwin S. Johanson, Princeton, N.J., assignors to the United States of America as represented by the Secretary of the Interior, and Hydrocarbon Research, Inc., New York, N.Y.
Filed Nov. 14, 1968, Ser. No. 775,618
Int. Cl. C10g 1/06
U.S. Cl. 208—10     4 Claims

ABSTRACT OF THE DISCLOSURE

An improved manner of operating a coal hydrogenation in an ebullated bed reactor wherein the composition of the liquid slurry within the reactor is controlled so as to contain a liquid residuum content of from about 30 to 45 weight percent and an unconverted processed solids content of from 10 to 25 weight percent. This control can be effected by recycle of liquid residuum having a portion of its solids removed.

This invention resulted from work done under Contract 14–01–0001–477 with the Office of Coal Research of the Department of the Interior.

BACKGROUND OF THE INVENTION

The H-Coal process converts coal to a light crude distillate by hydrogenation in an ebullated catalyst bed reactor. The present invention is related to improvements in the H-Coal process directed to increasing the conversion of coal into valuable hydrocarbons by utilizing recycle of slurry oil, composition control, recycle rate and solids content of recycle liquid to the ebullated bed reactor. It has been found that a major factor effecting the conversion of coal to distillate products by hydrogenation in an ebullated bed is the concentration residuum in the reactor zone. A greater amount of residuum in the reactor liquid results in a liquid product having a higher proportion of distillate material and less residuum than heretofore obtained. It has been normal, in the past, to increase residuum concentration in the reactor by recycling a bottoms portion from the initial liquid effluent flash to the reactor. This bottoms portion however includes a high concentration of unconverted processed solids in the form of ash and unconverted coal. This type of solids built-up in the reactor can destroy the operability of the system with respect to proper temperature control and fluidization of the catalyst bed. Consequently if an attempt is made to increase the residuum concentration of the reactor liquid, and thereby increase coal conversion, by such a recycle, the operability of the system rapidly decreases due to build-up of unconverted processed solids in the reactor.

SUMMARY OF THE INVENTION

The present invention is directed to an improved method of hydrogenating coal in an ebullating bed reactor wherein the concentration of both the residuum in the reactor liquid and unconverted processed solids in the reactor are optimized. More particularly, the invention is concerned with a system for the removal of solids from a high residuum concentration liquid effluent from an ebullated bed coal hydrogenation unit, with subsequent recycle of the clarified liquid.

Accordingly, it is the object of this invention to provide an improved coal hydrogenation process. Further, it is an object of this invention to provide an improved method for optimizing the yields from a coal hydrogenation process.

These and other objects and advantages will become apparent upon consideration of the following description of the drawings and preferred embodiments.

BRIEF DESCRIPTION OF THE DRAWING

The accompanying drawing is a flow plan of an ebullated bed coal hydrogenation process wherein clarified residue is recycled to the reactor according to the present invention.

DETAILED DESCRIPTION OF THE PREFERRED EMBODIMENTS

Referring now to the accompanying drawing, there is shown a simplified flow diagram of an ebullated bed coal hydrogenation. In that figure, 10 represents a stream of coal feed which is usually ground to a particulate size of from about 30-mesh to 325-mesh. Coal stream 10 is slurried with a combination of liquid hydrocarbon from streams 12, 14 and 16 and then mixed with hydrogen from stream 18. The combined mixture is introduced through line 20 into an ebullated bed reactor 22. Reactor 22 contains a feed zone 24, a catalyst containing zone 26, a liquid product zone 28 and a gaseous product zone 30. The feed slurry passes from the feed zone 24 to the catalyst containing zone 26 through distributors 32. Any conventional hydrogenation catalyst may be used in zone 26 however, cobalt-molybdate compositions are preferred. The temperature within reactor 22 should be kept in the range of from about 425 to 475° C. At these temperatures, hydrogenation of the coal produces liquid and gaseous hydrocarbons which, because of their lower densities form zones 28 and 30 respectively, within reactor 22. A portion of the liquid within zone 28 is brought back through the catalyst bed 26 by internal recycle through collector 34, and line 36. Gaseous hydrocarbons are withdrawn from reactor 22 through line 38 and are separated in an atmospheric still 40 into a light distillate product 42 and a heavy distillate product 44. A portion 12 of the heavy distillate may be recycled to slurry the coal feed. Liquid hydrocarbons are withdrawn from reactor 22 through line 46 and are separated in flash drum 48 into a light portion and a residue portion. The light portion is conveyed through line 50 to line 38 for introduction into still 40 whereas the residue portion containing heavy liquid hydrocarbons and solids is passed via line 52 to a vacuum still 54 where further distillate portions 56 and 58 are recovered as overhead. The bottoms stream 60 from still 54 consists primarily of residuum and unconverted processed solids. This stream is then passed to a liquid-solid separating apparatus such a the liquid cyclone 62 shown in the drawing. Cyclone 62 produces a liquid residue stream 16 for recycle and a solids containing stream 64. Stream 64 may be further processed as in tower 66 to remove additional liquid residue 14 for recycle while converting the solid portion to char 68.

The improvement obtained by the present invention over the prior art is brought about by controlling the amount and composition of the slurry entering the ebullated bed reactor. We have found that optimum results are obtained by maintaining a residuum concentration in the reactor liquid of from 30 to 45 weight percent while maintaining the concentrate of unconverted processed solids in the reactor liquid at from about 10 to 25 weight percent, and preferably in the range of from 10 to 20 weight percent.

These reactor conditions can be met by recycle of liquid residuum hydrogenation products having reduced solids content. In practice, solids can be removed to a desired level by passing a liquid residuum containing solids such as stream 60 through a liquid cyclone such as 62. The solids leaving a cyclone such as 62 can be further treated as in tower 66 to remove further liquid residuum for recycle.

Though the conditions stated above are preferred, the balance of reacting ingredients will depend upon the desired balance of end products and the ability of the catalyst bed to maintain its fluidized state as solids content is increased in the reactor.

Although the invention has been described in terms of the accompanying diagram and preferred embodiments, it will be appreciated by those skilled in the art that many modifications and adaptations of the process are possible within the spirit and scope of the invention which is defined in the claims below.

What is claimed is:

1. In a process for the hydrogenation of coal wherein particulate coal is admixed with a liquid hydrocarbon to form a slurry which is passed to an ebullated bed reactor where the coal is catalytically hydrogenated to produce hydrocarbon products including a liquid residuum having unconverted processed solids contained therein, the improvement comprising maintaining in said reactor a liquid residuum content of from about 30 to 45 weight percent and an unconverted processed solids content of 20% by weight or less by treating a portion of the product liquid residuum to remove a portion of the solids contained therein and recycling solids depleted liquid residuum to the coal slurry entering said reactor.

2. The method of claim 1 wherein said portion of product liquid residuum is treated to remove a portion of the solids contained therein by passage through a liquid cyclone.

3. The method of claim 1 wherein said unconverted processed solids content is maintained at from 10 to 20 percent by weight.

4. The method of claim 3 wherein said portion of product liquid residuum is treated to remove a portion of the solids contained therein by passage through a liquid cyclone.

References Cited
UNITED STATES PATENTS

| 2,987,465 | 6/1961 | Johanson | 208—10 |
| 3,075,912 | 1/1963 | Eastman et al. | 208—8 |
| 3,183,180 | 5/1965 | Schuman et al. | 208—10 |
| 3,030,297 | 4/1962 | Schroeder | 208—8 |
| 3,321,393 | 5/1967 | Schuman et al. | 208—10 |
| 3,496,094 | 2/1970 | Smith | 208—8 |

DELBERT E. GRANTZ, Primary Examiner

V. O'KEEFE, Assistant Examiner